US012676574B2

(12) United States Patent
Somayajula et al.

(10) Patent No.: US 12,676,574 B2
(45) Date of Patent: Jul. 7, 2026

(54) SOLAR CHARGER USB RECEIVER FOR LAPTOPS

(71) Applicants: Chinmay Somayajula, Boulder, CO (US); Nagesh Somayajula, Boulder, CO (US); Nagalakshmi Somayajula, Boulder, CO (US)

(72) Inventors: Chinmay Somayajula, Boulder, CO (US); Nagesh Somayajula, Boulder, CO (US); Nagalakshmi Somayajula, Boulder, CO (US)

( * ) Notice: Subject to any disclaimer, the term of this patent is extended or adjusted under 35 U.S.C. 154(b) by 423 days.

(21) Appl. No.: 18/350,236

(22) Filed: Jul. 11, 2023

(65) Prior Publication Data

US 2023/0353086 A1 Nov. 2, 2023

(51) Int. Cl.
*H02S 40/34* (2014.01)
*H01M 10/46* (2006.01)
*H02J 7/35* (2006.01)
*H02S 40/38* (2014.01)

(52) U.S. Cl.
CPC ........... *H02S 40/34* (2014.12); *H01M 10/465* (2013.01); *H02J 7/35* (2013.01); *H02S 40/38* (2014.12)

(58) Field of Classification Search
CPC ................................. H02S 40/34; H02S 40/38
See application file for complete search history.

(56) References Cited

U.S. PATENT DOCUMENTS

| | | | | |
|---|---|---|---|---|
| 3,317,809 | A * | 5/1967 | Bowers ................... | F21S 9/032 |
| | | | | 307/66 |
| 5,522,943 | A * | 6/1996 | Spencer ................... | H02S 30/20 |
| | | | | D13/102 |
| 6,134,902 | A * | 10/2000 | Curry ....................... | H02S 20/30 |
| | | | | 62/235.1 |
| 10,291,063 | B1 * | 5/2019 | Feare ...................... | H02J 7/0044 |
| 11,962,271 | B1 * | 4/2024 | Cunning ................. | H02S 40/36 |
| 2005/0161079 | A1 * | 7/2005 | Gray ...................... | H04B 1/3883 |
| | | | | 136/251 |
| 2007/0222410 | A1 * | 9/2007 | Lee .......................... | H10F 19/80 |
| | | | | 320/101 |

(Continued)

FOREIGN PATENT DOCUMENTS

| | | | | | |
|---|---|---|---|---|---|
| GB | 2298325 | A | * | 8/1996 | ............. A45C 15/00 |
| KR | 101523022 | B1 | * | 6/2015 | ............. H02S 40/38 |
| WO | WO-2010096709 | A2 | * | 8/2010 | ............. H02S 40/38 |

*Primary Examiner* — Golam Mowla

(57) ABSTRACT

The present invention is a USB receiver charger for laptops consisting of four internal layers and two external layers. The external layers feature a thin photovoltaic (PV) panel that captures both sunlight and artificial light, integrated on both sides of the USB. Internally, the first layer houses high-powered LED COB lights, illuminating the second layer—the PV panel. The PV panel absorbs light, converting it into electrical energy stored in a rechargeable battery. Excess power is stored in a power bank. The rechargeable battery distributes the energy, powering the LED lights and transferring the remaining power to the device being charged. A solar charge controller, PV energy converter, and temperature controller are included to regulate power distribution and prevent overcharging. The LED lights dim when the power bank reaches maximum capacity to prevent unnecessary energy generation. The USB, equipped with three PV panels, generating minimum 25 watts for efficient laptop charging.

4 Claims, 7 Drawing Sheets

(56)         References Cited

U.S. PATENT DOCUMENTS

| | | | |
|---|---|---|---|
| 2009/0007958 A1* | 1/2009 | Ho | H02J 7/35 |
| | | | 320/101 |
| 2011/0273133 A1* | 11/2011 | Sala | H01M 10/465 |
| | | | 320/101 |
| 2015/0244306 A1* | 8/2015 | Estes | H02S 40/32 |
| | | | 700/287 |
| 2020/0060403 A1* | 2/2020 | Robinson | A45C 13/02 |

* cited by examiner

SOLAR CHARGER USB RECEIVER FOR LAPTOPS

BACKGROUND OF THE INVENTION

I. Field of the Invention

The present invention relates to power sources for charging laptop batteries and, more particularly, to a USB receiver charger utilizing integrated photovoltaic panels for capturing light energy.

II. Description of the Related Art

Conventional laptop computers depend primarily on alternating current (AC) electric power supplied by wall outlets for battery charging. However, AC power outlets are not always conveniently accessible, especially when using laptop computers in mobile or outdoor settings. As such, alternative power sources that can charge laptop computer batteries independently of AC power outlets, particularly using renewable energy sources, have attracted increased attention.

Photovoltaic panels that capture light energy have been widely used to generate electric power on a large scale but have seen limited application in charging the batteries of portable electronic devices such as laptop computers.

The present invention provides a portable USB receiver charger incorporating photovoltaic panels, a high-intensity light-emitting diode (LED) light, a rechargeable battery, and an electric power storage bank for efficiently capturing ambient light energy and charging the battery of a laptop computer connected to the USB receiver charger through a USB connector. The USB receiver charger additionally includes components for optimizing the production and distribution of electric power from the captured light energy, such as a solar charge controller, a temperature controller, and a LED dimming feature.

BRIEF SUMMARY OF THE INVENTION

The present invention is a USB receiver charger for laptops that utilize integrated photovoltaic (PV) panels to capture both sunlight and artificial light. The USB receiver charger connects to the laptop's charging port using a USB Type-C connector. It consists of four internal layers and two external layers, with a high-powered LED chip on board lights in the first internal layer and a PV panel in the second internal layer. The PV panel absorbs light and converts it into electrical energy stored in a rechargeable battery. Excess power is stored in a power bank. The USB receiver charger incorporates a solar charge controller, PV energy converter, and temperature controller to regulate power distribution and prevent overcharging. It also includes a smart dimming feature that reduces LED brightness when the power bank is full. This invention provides a sustainable and efficient solution for laptop charging, utilizing renewable energy sources and intelligent power management. By harnessing renewable energy sources and employing advanced power management technologies, this USB receiver charger exemplifies the future of sustainable laptop charging. It revolutionizes the way laptops are powered, offering an eco-friendly, efficient, and convenient solution for users worldwide.

DETAILED DESCRIPTION OF THE INVENTION

Figure 1:
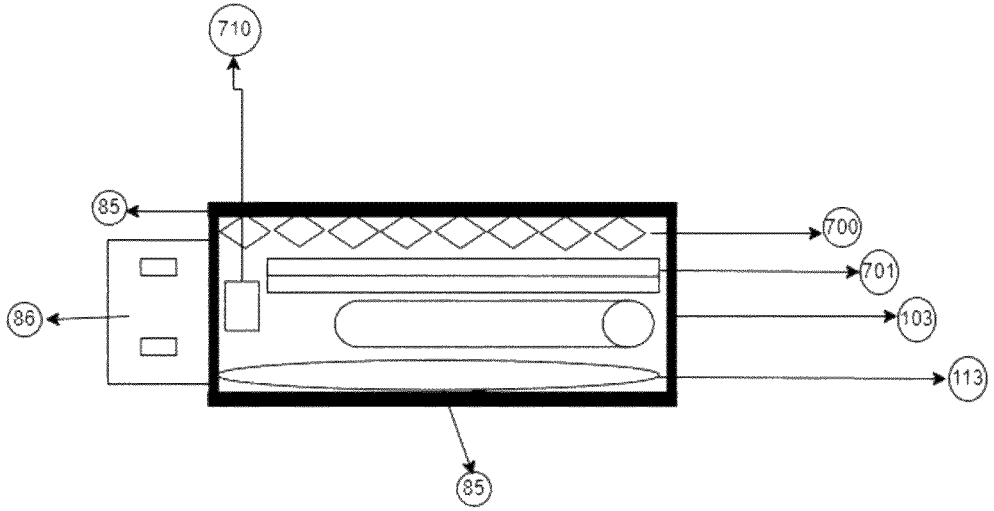
FIG. 1 is showcasing the structure of the solar-powered USB receiver.

The USB receiver charger is designed to connect to the charging port of a laptop using the USB Type-C, a universal and widely used connector. The USB receiver charger consists of several components and functionalities that enable efficient and sustainable charging.

The USB receiver charger comprises four internal layers and two external layers. The external layers feature thin photovoltaic (PV) panels integrated on both sides of the USB. These PV panels are capable of harnessing both sunlight and artificial light, maximizing the energy conversion efficiency.

Within the internal layers, the USB receiver charger incorporates a high-powered LED chip on board lights in the first layer. This layer is responsible for illuminating the second layer, which consists of a PV panel. The PV panel absorbs the light and converts it into electrical energy through the photovoltaic effect.

The electrical energy generated by the PV panel is stored in a rechargeable battery, which acts as an energy reservoir. Any excess power beyond the immediate charging needs is stored in a power bank, ensuring that no energy goes to waste.

The rechargeable battery divides the energy flow into two paths. A portion of the energy is allocated to power the LED chip on board lights, providing illumination for visual feedback and charging status indicators. The remaining energy is transferred to the device being charged, efficiently delivering power for the laptop's operation and battery replenishment.

To regulate the power distribution and prevent overcharging, the USB receiver charger includes a solar charge controller, PV energy converter, and temperature controller. These components work in tandem to ensure the optimal utilization and management of the available energy.

Additionally, a smart dimming feature is incorporated into the USB receiver charger. When the power bank reaches its maximum capacity, the LED lights will not receive the power from the rechargeable battery which automatically dims the LED lights to indicate that no further energy generation is necessary, preventing unnecessary power consumption.

Overall, the USB receiver charger with its integrated PV panels, rechargeable battery, power bank, and intelligent power management system provides a sustainable and efficient solution for laptop charging, reducing reliance on traditional power sources and contributing to environmentally friendly charging practices.

The present idea is intended to charge laptops using solar-powered USB based on the energy generated by solar light and striving for a safer environment—the major functions of solar panel Photovoltaic (PV) panels convert sunlight into electricity through a process called the photovoltaic effect.

The USB receiver will work on solar-powered LEDs and natural sunlight, where LEDs are used as part of a larger system to extract and convert energy from ambient light sources (it can be solar and even a normal light system). Using "solar-powered LEDs" or "solar LEDs" USB charger will help to make computers, and laptops charge without depending on AC power. The USB receiver will consist of normal (standard) parts used in solar-powered equipment such as—

1. Solar Cells: Solar panels consist of individual solar cells made of semiconductor materials, usually silicon. These cells are the building blocks of the panel and are responsible for converting sunlight into electrical energy. Each solar cell contains multiple layers of silicon, with different electrical properties.

2. Photovoltaic Effect: The photovoltaic effect is the key principle behind solar panel operation. When sunlight (composed of photons) strikes the solar cell, it excites the electrons within the semiconductor material, allowing them to break free from their atoms. This creates a flow of electrons, generating an electric current.

3. Semiconductor Layers: Solar cells have two semiconductor layers: the P-type (positive) layer and the N-type (negative) layer. The P-type layer contains an excess of positively charged particles, called holes, while the N-type layer has an excess of negatively charged particles, called electrons. The boundary between these layers is known as the P-N junction.

4. Electric Field Formation: Due to the P-N junction, an electric field is created within the solar cell. This electric field acts as a barrier, preventing the free movement of electrons and holes across the junction. The electric field causes the electrons to move toward the N-type layer and the holes to move toward the P-type layer.

5. Current Generation: When sunlight strikes the solar cell, photons transfer their energy to the electrons in the valence band of the semiconductor material, allowing them to move to the conduction band. The electric field at the P-N junction then causes the separated electrons and holes to move in opposite directions, creating a flow of current.

6. Metal Contacts: Metal contacts are placed on the front and back surfaces of the solar cell to collect the generated current. The metal grids on the front surface allow sunlight to reach the semiconductor material, while the metal contact on the back surface collects the electrons and completes the electrical circuit.

7. Wiring and Electrical Output: Multiple solar cells are connected in series or parallel within a solar panel to increase voltage and current output. The electrical output from the solar panel is directed through wiring and connected to an inverter, which converts the direct current (DC) produced by the solar panels into alternating current (AC) suitable for laptop charging.

8. Sunlight and Efficiency: The amount of electricity generated by solar panels depends on various factors, including the intensity of sunlight, the angle and orientation of the panels, to make it usable this USB receiver is incorporated with high-powered LED COB lights which will make normal light and sunlight from the outer PV panel used as charging parameters all together can generate enough power to run a laptop.

Solar panels have become a popular and sustainable source of renewable energy. Their ability to convert sunlight into electricity will use to charge laptops very easily and it will help to reduce reliance on fossil fuels and decrease carbon emissions.

DETAILED DESCRIPTION OF THE DRAWINGS

FIG. 1 shows the components and structure of the solar-powered USB receiver. The outer body of the device is equipped with two PV panels (85), strategically positioned to capture energy from sunlight and artificial light sources. These PV panels utilize photovoltaic technology to convert solar radiation into electrical energy. The USB port featured in the device is a USB-C universal port (86), enabling compatibility with most laptops and facilitating charging through the use of universal cables.

To enhance the energy-harvesting capabilities of the device, chip-on-board LED lights (700) are integrated. These LED lights are specifically designed to charge an interior PV panel (701), which further contributes to the overall energy supply.

the solar-powered USB device incorporates a rechargeable battery (103) and a power bank (113). The rechargeable battery serves as a storage unit for the generated energy, allowing for a sustained power supply even when sunlight or artificial light is unavailable.

To ensure efficient energy management, the device is equipped with a solar charge controller (710). This controller regulates the distribution of energy between the chip-on-board LED lights, the interior PV panel, and the USB port. By monitoring the available energy and the charging requirements of connected devices, the solar charge controller optimizes the allocation of power, thereby maximizing charging efficiency and maintaining stable power output.

Figure 2:
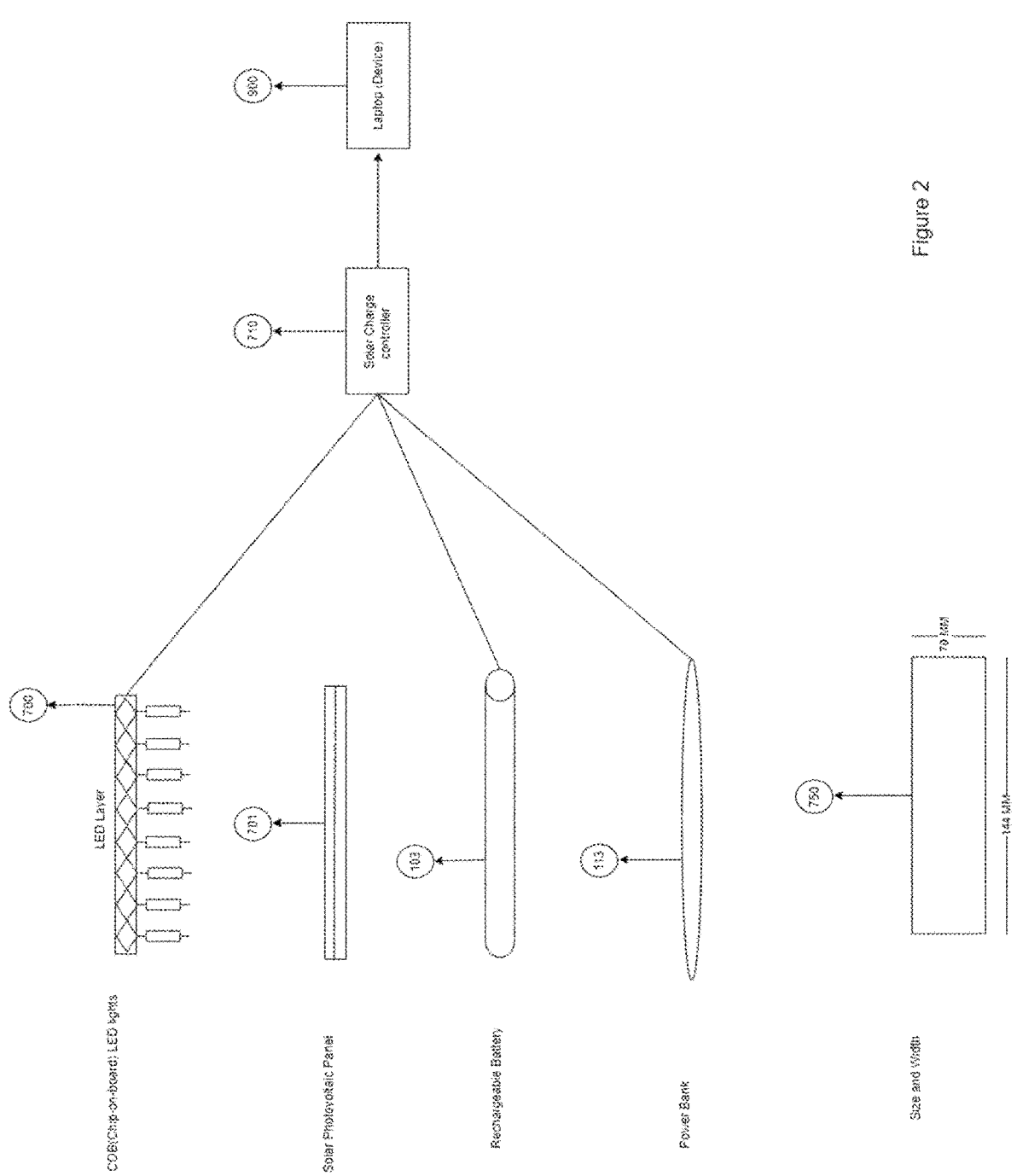
FIG. 2 is the internal components of the USB receiver, showcasing the inventive system and its various functionalities.

As shown in FIG. 2, within the USB receiver, electrical energy is generated through the operation of LED lights (700). These LED lights emit bright lighting, which is directed onto a solar photovoltaic panel (701). The solar photovoltaic panel (701) utilizes this light energy to generate electrical energy through photovoltaic conversion.

The generated electrical energy is then channeled to a rechargeable battery (103), which serves as a storage unit. The rechargeable battery (103) receives and stores the electrical energy from the solar photovoltaic panel (701). Moreover, any excess energy beyond the immediate requirements is collected and stored in a power bank (113), which acts as an additional energy storage.

To ensure effective management and distribution of the electrical energy, the system incorporates a solar charge controller (710). The solar charge controller (710) performs multiple functions within the system. Firstly, it acts as a distributor of electrical energy, facilitating its proper allocation. Additionally, the solar charge controller (710) regulates the flow of energy, ensuring its efficient utilization. Furthermore, the solar charge controller (710) manages excess heat generated within the system, contributing to its optimal performance.

Based on the allocation determined by the solar charge controller (710), 30% of the electrical energy is directed towards powering the LED lights, while the remaining 70% is supplied to the device (900) requiring power.

It is noteworthy that the USB receiver, as depicted in FIG. 2, possesses specific physical dimensions. The height and width of the USB receiver measure 70×144 mm (750), ensuring a suitable form factor for compatibility with various USB-compatible devices.

Figure 3:
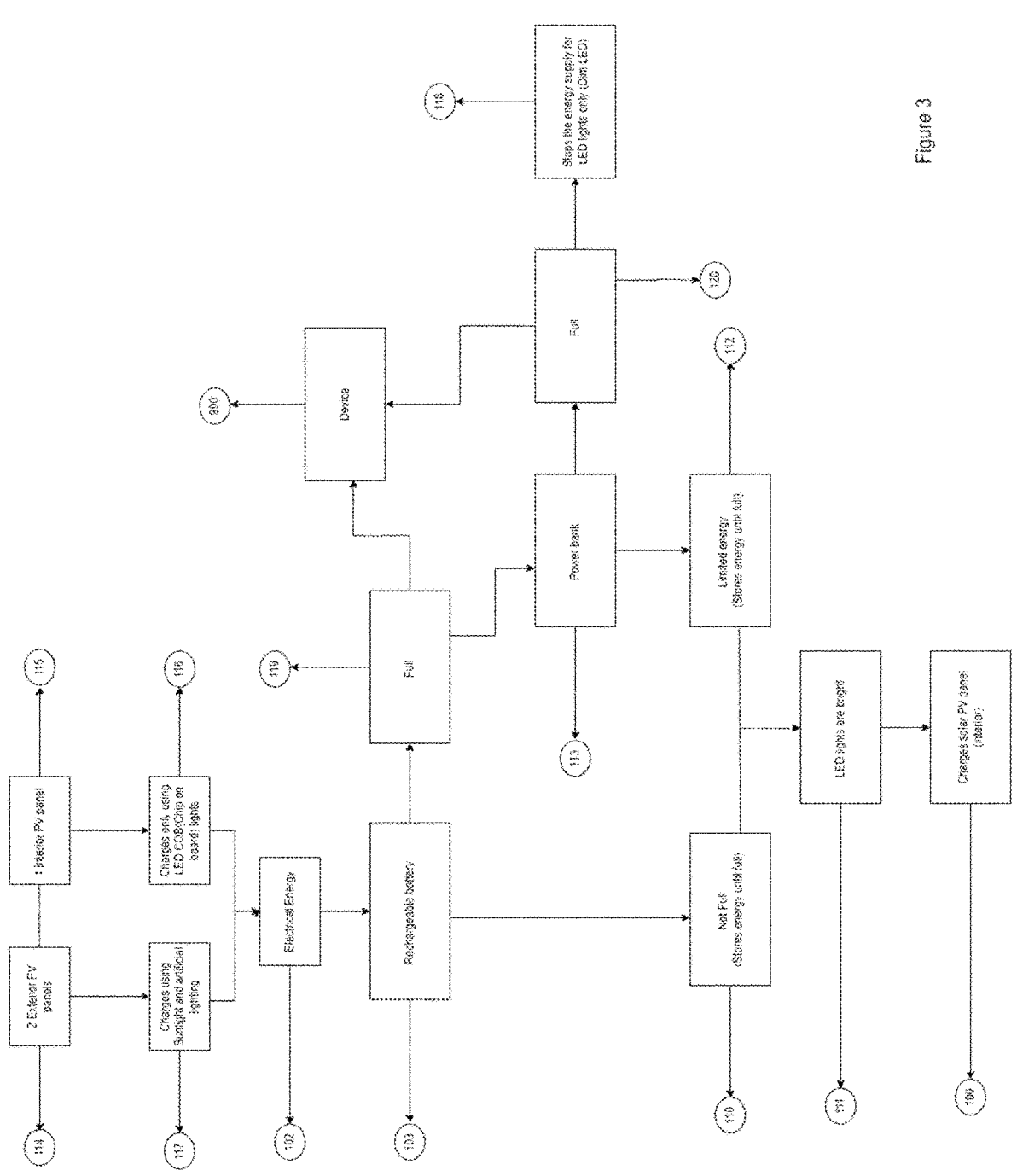
FIG. 3 is an illustration of energy generation in the USB receiver.

As shown in FIG. 3, energy generation involves the utilization of two exterior PV panels (114) and one interior PV panel (115).

The two exterior PV panels are designed to harness energy from both sunlight and artificial light sources (117). Simultaneously, the interior PV panel captures energy from the LED lights embedded within the USB receiver (116). The combined energy generation from the two exterior PV panels and the interior PV panel results in electrical energy (102).

To store the electrical energy, a rechargeable battery (103) is employed. If the rechargeable battery is not at maximum capacity (110), the electrical energy (102) continues to be collected until the rechargeable battery reaches its maximum limit (119). Once the rechargeable battery is full, the surplus electrical power is directed to a power bank (113).

If the power bank is not yet at full capacity (112) and the rechargeable battery is full, the electrical energy (102) is diverted to the power bank for storage. Once the power bank reaches its maximum capacity (120), the electrical power can be transmitted to the connected device (900) for use.

However, when both the rechargeable battery and the power bank are full, the energy distribution ceases. The flow of energy to the LED lights is interrupted, dimming their brightness and preventing further power generation from the interior PV panel (115). Additionally, sensors are employed to detect and halt the energy generation from the exterior PV panels (114), ensuring no additional energy is produced.

In instances where the rechargeable battery is not yet full (110) and the power bank is not at its minimum limit (112), or below the required threshold, the LED lights remain bright (111). This facilitates the regulation of energy generation from the PV panels (100) to maintain optimal efficiency.

Figure 4:
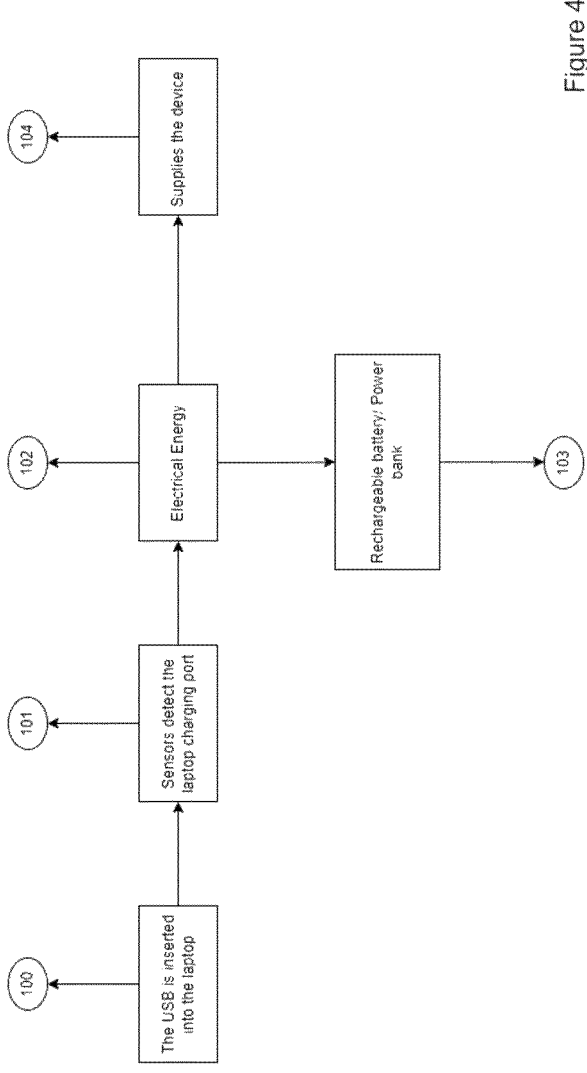
FIG. 4 is a flowchart of the supply of electrical energy to the Laptop.

FIG. 4 is the process of utilizing the USB receiver to charge a laptop (100). The USB receiver is inserted into the laptop, establishing the physical connection required for power transfer. Once the connection is established, the sensors integrated within the USB receiver begin detecting the charging port of the laptop (101). This detection mechanism ensures compatibility and proper alignment between the USB receiver and the laptop's charging port.

Following the successful detection of the charging port, (102) where the electrical energy is transferred from the external power source to the laptop. Before initiating the transfer of electrical energy, the system performs a preliminary check (103) to assess the availability of sufficient power sources. This check involves evaluating the status of the rechargeable battery within the laptop itself and the power bank. By examining both power sources, the system ensures that the most optimal and efficient energy supply is utilized.

Once the check is complete, the actual transfer of electrical energy to the laptop commences (104). The USB receiver acts as an intermediary, facilitating the flow of energy from the external power source to the laptop's internal battery or directly to the device being charged.

Figure 5:
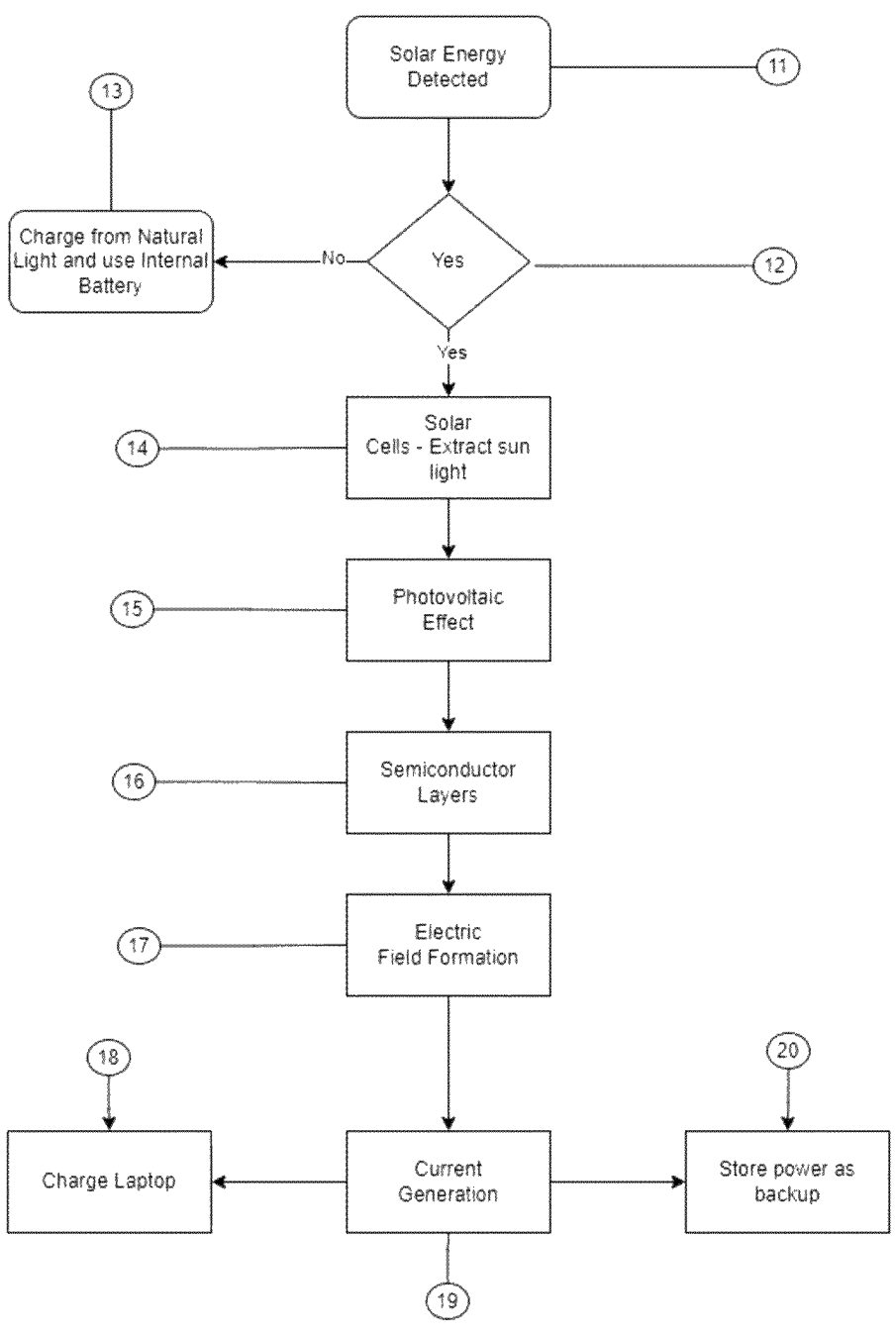
FIG. 5 is a flowchart illustrating the operation of a solar energy panel system.

FIG. 5 shows a flowchart illustrating the operation of a solar energy panel system. The process begins at (11), where the solar energy panel starts capturing power from the sun. Moving to (12), a decision is made to check if solar energy is currently available. If it is determined that solar energy is not available, the system redirects to (13), where battery power is utilized to charge a laptop.

To generate solar energy, (14) involves the solar cell within the panel extracting sunlight and converting it into usable energy. This conversion is achieved through the photovoltaic effect (15), wherein the solar cell generates an electric current upon exposure to sunlight.

(16) is the composition of the solar cells, consisting of two semiconductor layers: the P-type (positive) layer and the N-type (negative) layer. The P-type layer contains an excess of positively charged particles called "holes," while the N-type layer has an excess of negatively charged particles known as "electrons." The boundary between these layers is referred to as the P-N junction.

The electric current is formed within the solar cell and starts flowing toward the device (17). The system then proceeds to (18), where the generated energy is utilized to charge a laptop. At the same time, (19) denotes the commencement of current generation from solar energy.

Any surplus energy is stored in a power backup, specifically a battery backup capable of storing up to 31 watts of energy (20).

Figure 6:
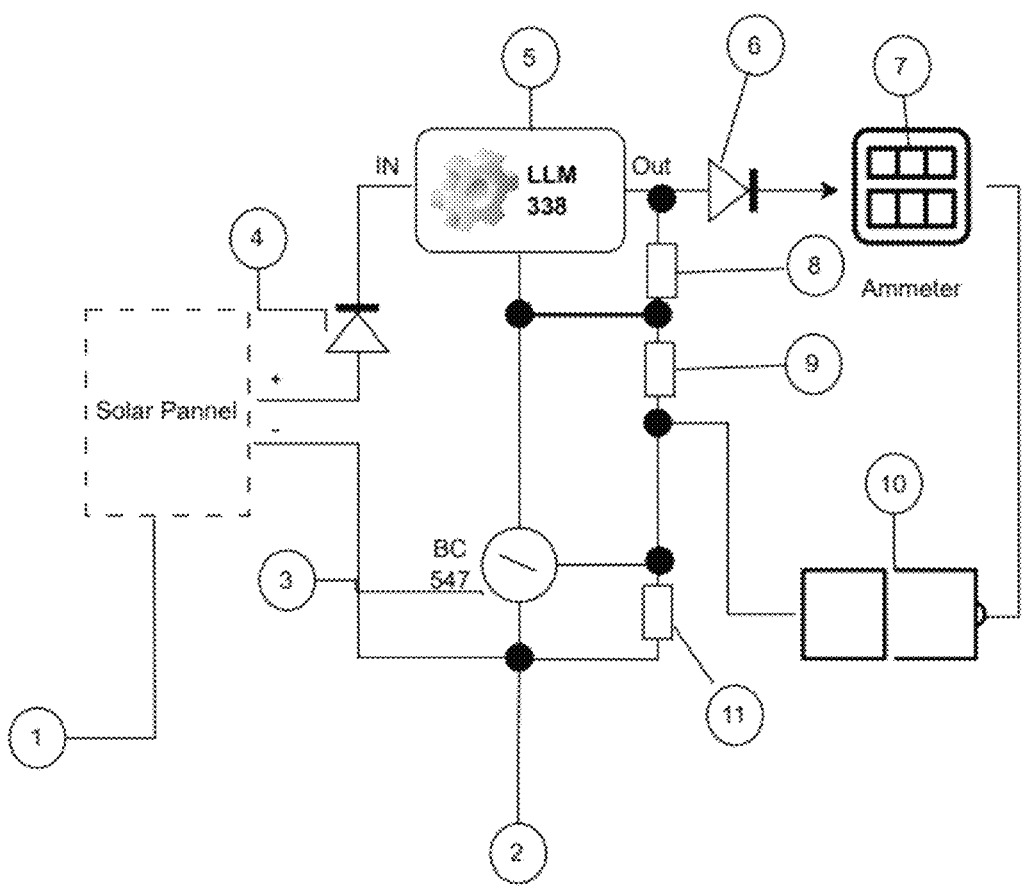
FIG. 6 is a flowchart of a circuit to manage power flow in a solar panel system.

As shown in FIG. 6, the circuit incorporates several essential components to ensure efficient and controlled energy distribution. At the core of the system is a solar panel (1) that functions as the primary power source, harnessing sunlight or artificial light to generate electricity. The panel is configured within a USB setup, allowing for easy connectivity.

A connector (2) is provided to establish the necessary connections between downstream and upstream systems, enabling seamless integration with external devices or power networks.

To regulate the power flow, a switch (3) is incorporated, granting control over the distribution of electricity. This switch governs the flow of power into both an internal battery and the laptop ensuring optimal utilization of the available energy.

To handle unwanted extreme temperatures and perform various crucial functions within the circuit, diodes (4) are strategically employed. These diodes act as rectifiers, signal limiters, voltage regulators, switches, signal modulators, signal mixers, signal demodulators, and oscillators.

A dedicated solar controller (5) is integrated into the circuit to monitor and manage the internal power flow. This controller ensures that the energy from the solar panel is efficiently distributed, maximizing the overall performance of the system.

Within the circuit, a node (6) is specifically designated to handle power flow management within the ammeter (7). The ammeter serves as a precision measuring instrument, accurately quantifying the electric current flowing through the circuit in units of amperes (A).

To facilitate controlled electrical resistance and maintain appropriate voltage levels, a resistor (8) is strategically placed within the circuit. This two-terminal component enables the reduction of current flow, division of voltages, blocking of transmission signals, and biasing of active elements, contributing to the overall stability and functionality of the circuit.

An additional resistor (90) is employed to exert control over the power from the lower side of the circuit, allowing for fine-tuning and optimization of energy distribution.

To ensure an uninterrupted power supply to the laptop, a battery power backup system (100) is included. This backup power source serves as a contingency in case of solar panel inefficiency or temporary power fluctuations, guaranteeing continuous and reliable operation.

The circuit incorporates R3 (110), a resistor with a resistance value of 152. This specific resistor is implemented to precisely control lower voltages within the circuit, contributing to the overall stability and safety of the system.

Figure 7:
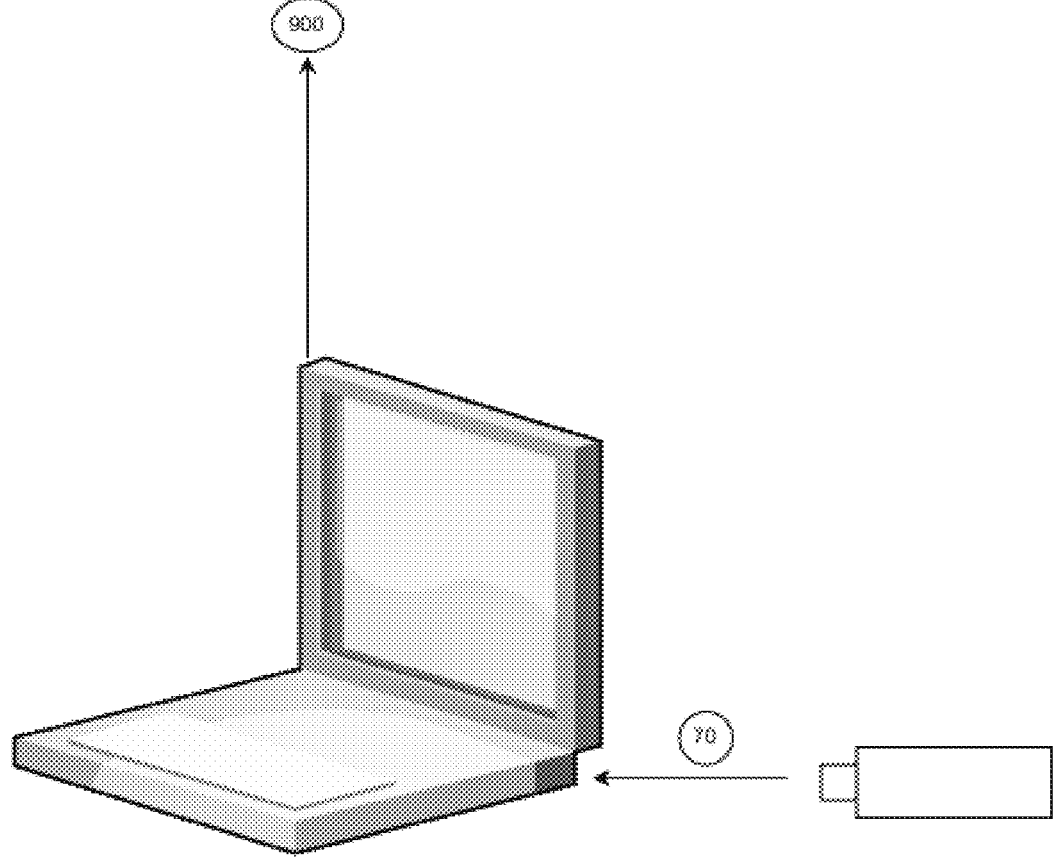
FIG. 7 is an illustration of the Device and the USB connected to the charging port.

FIG. 7 shows the USB receiver should be connected to the laptop's charging port to charge the device effectively. The device (900) can only charge when the USB receiver is inserted into the device's charging port to establish connectivity.

The invention claimed is:

1. A USB receiver charger for laptops, comprising:

four internal layers and two external layers;

integrated thin photovoltaic (PV) panels on both external sides;

high-powered LED chip on board lights located within the USB receiver charger;

a PV panel capable of absorbing light and generating electrical energy;

a rechargeable battery for storing electrical energy;

a power bank for storing excess power;

a solar charge controller configured to regulate distribution of energy between the rechargeable battery and a device being charged;

a PV energy converter connected to the integrated thin PV panels; and a temperature controller for regulation;

wherein the high-powered LED chip on board lights are configured to automatically dim when the power bank reaches maximum capacity; and wherein the USB receiver charger has a capacity to deliver a minimum of 25 watts of power for laptop charging.

2. The USB receiver charger as claimed in claim 1, wherein the integrated thin PV panels capture both sunlight and artificial light to convert into electrical energy efficiently.

3. The USB receiver charger as claimed in claim 1, wherein the USB receiver charger's internal layers are specifically designed to optimize the charging process and power distribution.

4. The USB receiver charger as claimed in claim 1, wherein the USB receiver charger's design enables the seamless integration of renewable energy sources for sustainable and portable laptop charging.

\* \* \* \* \*